United States Patent [19]

Koepplin

[11] 4,218,070
[45] * Aug. 19, 1980

[54] UNPOWERED SUPPORT VEHICLE

[76] Inventor: Gilbert L. Koepplin, 25173 N. Hwy. 99, Acampo, Calif. 95220

[*] Notice: The portion of the term of this patent subsequent to Oct. 31, 1995, has been disclaimed.

[21] Appl. No.: 909,027

[22] Filed: May 24, 1978

Related U.S. Application Data

[63] Continuation of Ser. No. 590,140, Jun. 25, 1975, Pat. No. 4,122,901.

[51] Int. Cl.³ .................................. B62D 55/26
[52] U.S. Cl. .................................. 280/28.5; 171/61; 305/57
[58] Field of Search ............ 280/28.5, 43, 43.2, 280/11.1 ET, 80 B; 171/61; 74/247; 305/32, 51, 46, 57, 39, 40, 58 R, 12, 16, 17, 18

[56] References Cited

U.S. PATENT DOCUMENTS

| 680,918 | 8/1901 | Henris | 305/40 |
|---|---|---|---|
| 1,043,038 | 10/1912 | Alexander | 280/43 |
| 1,314,077 | 8/1919 | Green | 305/40 |
| 1,730,059 | 10/1929 | Carvin | 305/16 |
| 2,440,518 | 4/1948 | Lewis et al. | 305/32 |
| 2,708,397 | 5/1955 | Cook et al. | 305/57 |
| 2,855,059 | 10/1958 | Sutherland | 305/32 |
| 3,070,175 | 12/1962 | McCollum | 280/43 |
| 3,808,783 | 5/1974 | Sutherland et al. | 171/61 |
| 4,122,901 | 10/1978 | Koepplin | 171/61 |

FOREIGN PATENT DOCUMENTS 715631 9/1931 France ............ 305/32

Primary Examiner—David M. Mitchell
Attorney, Agent, or Firm—Roy L. Brown

[57] ABSTRACT

A belted-track vehicle, unpowered and attached to a cantilevered apparatus to support the apparatus clear of the ground and adapted to be driven by the apparatus.

4 Claims, 7 Drawing Figures

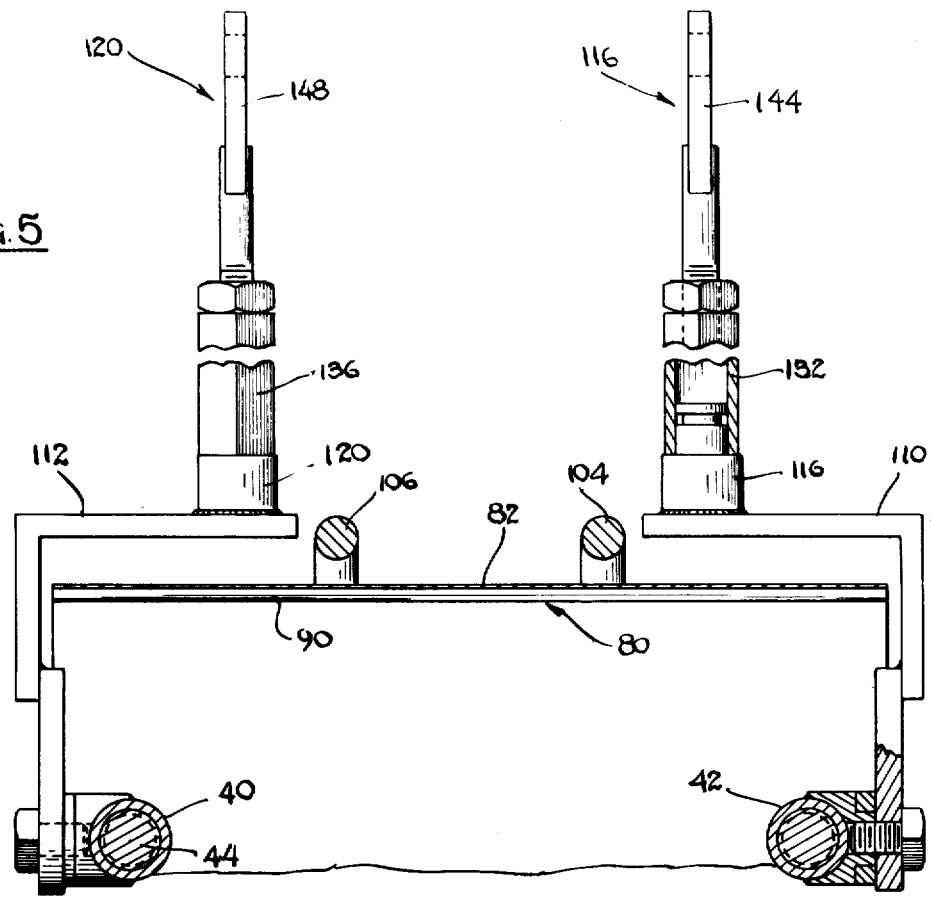
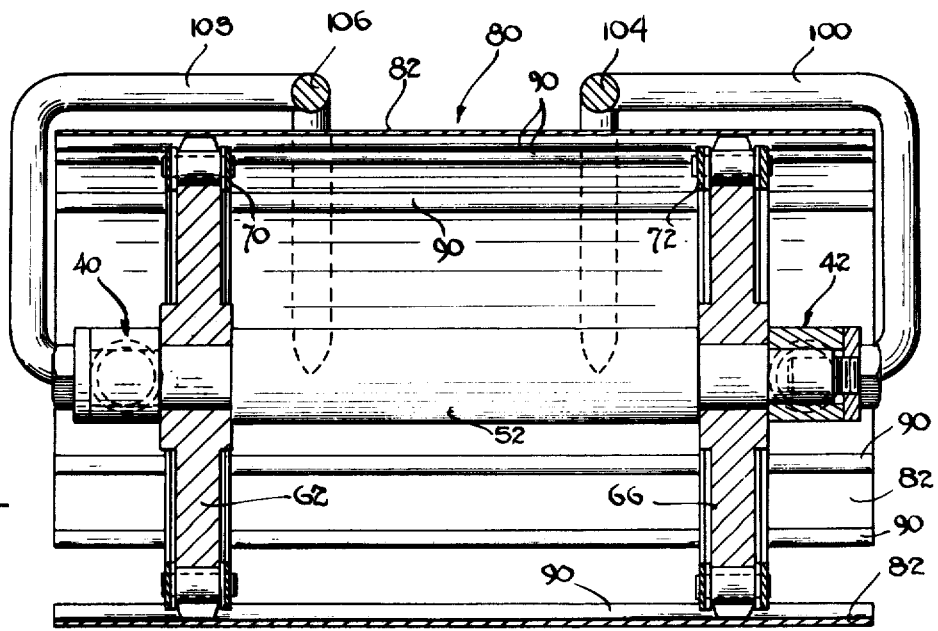

UNPOWERED SUPPORT VEHICLE

BACKGROUND OF THE INVENTION

This is a Continuation of United States patent application Ser. No. 590,140, filed June 25, 1975, now U.S. Pat. No. 4,122,901 which issued Oct. 31, 1978 for an UNPOWERED SUPPORT VEHICLE.

A radish picker is an apparatus which is cantilevered forward of a tractor and positioned with its outer end adjacent the ground. A pair of counter-rotating belts are positioned close together on the cantilevered boom to pinch the radish stems and carry the radishes toward a radish hopper on the tractor.

Frequently the ground is not level, and frequently the ground is soggy which causes the radish picker to have improper height adjustment over the ground. To remedy this defect, the operator must continually adjust the height of the radish picker as the tractor and radish picker moves forward over the ground. Should the tractor mire unexpectedly, the radish picker digs into the ground.

The same difficulty, conceivably could happen to similar agricultural apparatus which have extending booms. For example, a melon picker might have the same problem.

BRIEF DESCRIPTION OF THE INVENTION

To prevent the radish picker or similar apparatus from striking the ground while still keeping the apparatus sufficiently near the ground, the device contemplated by this invention is a small belted-track vehicle which rides under the cantilevered apparatus such as a radish picker.

The vehicle of this invention is adjustably connected to the boom of the radish picker. That is, the relative position of the boom, up and down, and forward and back of the vehicle is adjustable by an adjustable link.

The vehicle has a frame which is attached through an adjustable linkage, or a pair of linkages to the radish picker.

On substantially the four corners of the frame are four sprockets which are mounted upon bearings for turning relative to the frame. A pair of sprocket chains connect the forward and afterward sprockets on each side of the frame. Between the chains and attached to the chains is a belt which carries the bearing of the apparatus on the ground.

In use, the belt rolls over the ground, supporting the vehicle frame at a predetermined height over the ground, and the frame, in turn, through adjustable linkages supports the cantilevered radish picker.

In a preferred embodiment, the support belt is made in segments to facilitate the removal of mud from the belt.

It is therefore an object of this invention to support cantilevered movable objects.

It is a more specific object of this invention to support cantilevered objects which extend from a moving powered vehicle.

It is a more specific object of this invention to support a cantilevered radish picker.

It is still a more specific object to provide an unpowered vehicle which achieves the above-mentioned objects.

BRIEF DESCRIPTION OF DRAWINGS

Other objects will become apparent from the following description, taken in connection with the accompanying drawings, in which:

FIG. 5 is a view, partly in section, taken at 5—5 in FIG. 3.

FIG. 6 is a view, partly in section, taken at 6—6 in FIG. 3.

FIG. 7 is a fragmentary view taken at 7—7 in FIG. 3.

DETAILED DESCRIPTION OF THE INVENTION

Figure 1:
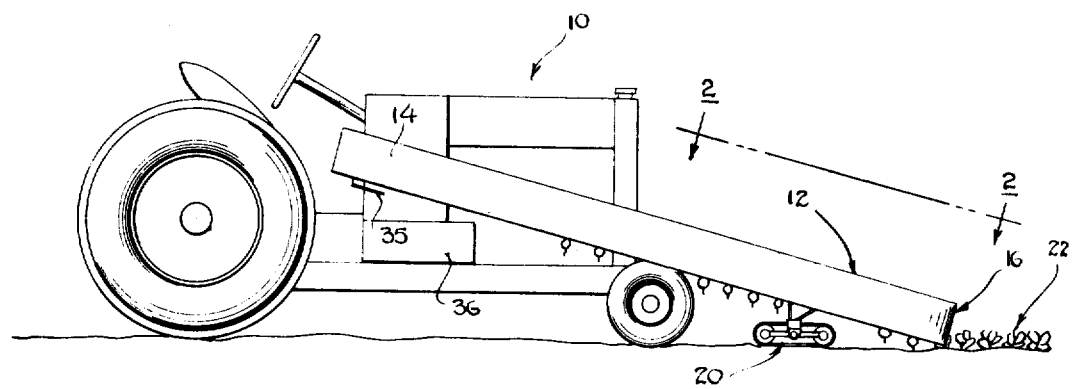
FIG. 1 shows a vertical view of a radish picker of the prior art, mounted on and cantilevered forward of a tractor, with the unpowered vehicle of this invention in place.

FIG. 1 shows a tractor 10 with a radish picker 12 cantilevered forward of the tractor. The radish picker 12 is typically pivoted about a pivot in the region 14 for up-down motion of the distant end 16. Hydraulic apparatus or pneumatic apparatus for lifting the radish picker 12 are not shown. The apparatus of this invention is shown generally at 20 as a belted non-powered vehicle which is positioned under the radish picker 12 to support the end of the radish picker 16 just above the ground so that it engages radishes 22 rather than striking the ground or being too high.

Figure 2:
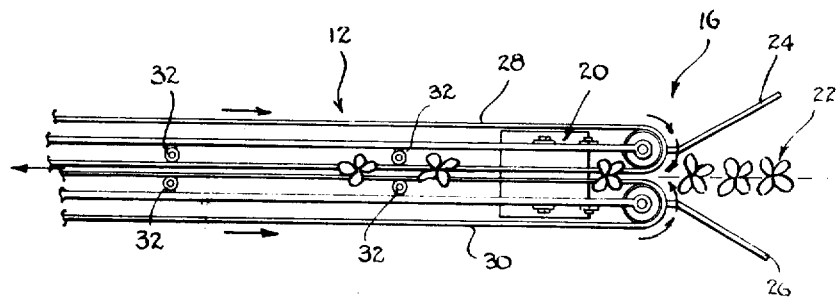
FIG. 2 is a view taken at 2—2 in FIG. 1.

The radish picker 12 may, optionally, have guide fences 24,26 as shown in the top view of FIG. 2 to guide the radishes slightly toward the center where they may be grasped at the stem by the belts 28,30. The belts 28,30 extend the length of the radish picker, and they are power driven by means not shown.

The powered belts 28,30 are counter-rotating so that the adjacent sides of the two belts travel in the same direction. To ensure engagement with the radishes, idler wheels 32 are spaced along the belts.

In operation, as the tractor moves forward, the radish picker engages the stems of the radishes 22, firmly grasping them and lifting them out of the ground. The radishes are then held as they move up the radish picker 12 until they reach a knife 35 which cuts the radish stems, allowing the de-stemmed radishes to drop into the hopper 36.

Figure 3:
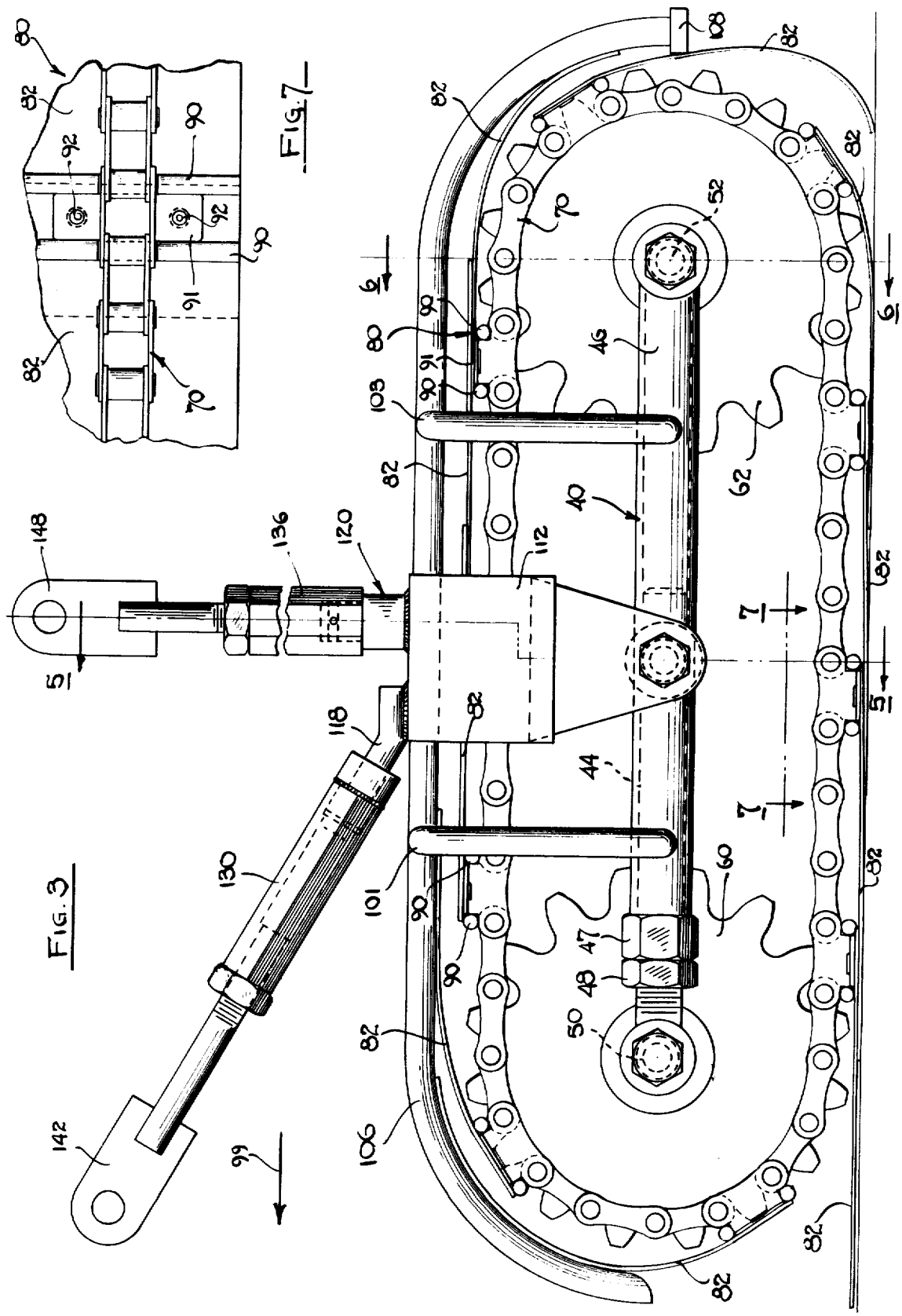
FIG. 3 is an enlarged view of the side of the unpowered vehicle according to this invention.
Figure 4:
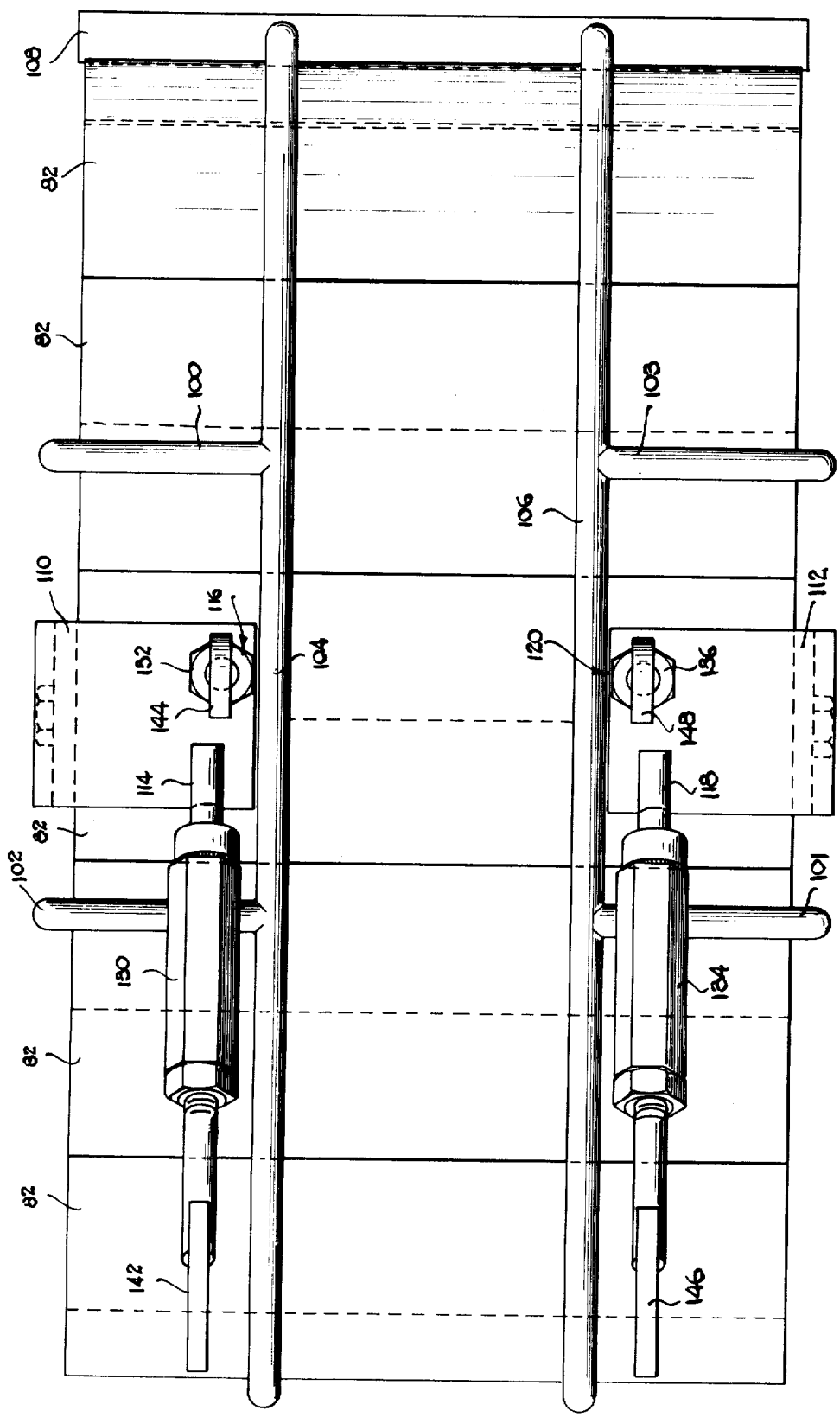
FIG. 4 is a top view of the vehicle of FIG. 3.

FIGS. 3-7 show the details of the belted vehicle 20. The vehicle of this invention comprises spaced apart and substantially parallel frame bars 40,42 which are shown particularly in FIGS. 5 and 6. They may be telescoping as shown in FIG. 3 wherein the element 44 screws into the element 46. Keeper nuts 47,48 prevent relative movement after setting.

Axles 50,52 are mounted at opposite ends of the frame bars 40,42 and are substantially perpendicular to the frame bars.

Four sprockets, three of which are shown in FIGS. 3 and 6, are connected for rotation substantially at the ends of the axles 50,52. Alternatively, the sprockets may be mounted on individual axles and bearings (not shown) relative to the frame members 40,42. The sprockets 60,62,64,66 are mounted at the four corners of the vehicle.

A first sprocket chain 70 is mounted between the sprockets 60,62 on one side of the vehicle, and an identical sprocket chain 72 is mounted between the sprockets 64,66 on the other side of the vehicle.

Cross-bars 90 are distributed along the chains 70,72, connecting the two chains together.

Covering and surrounding the chains and the frame is a belt 80. The belt 80 is preferably made of overlapping sections 82. The individual sections are attached to the cross-bars 90 on the leading edge of the sections as shown more particularly in FIG. 7. The cross-bars 90 carry angle irons on each end which are attached to the belt sections, for example, by rivets 92.

The arrow 100 designates the direction of movement of the vehicle. On the top of the vehicle, the leading end of the sections 82 corresponds to the leading end of the vehicle. Adjacent the ground, the leading end of the belt sections 82 corresponds to the trailing end of the vehicle because the chain appears, from the standpoint of the axles 50,52 to be moving backward.

The sectioning of the belt produces overlapping portions which act as a belt tread, whereby as the vehicle is pushed ahead, the belt engages the ground to cause the belt, sprocket chain, and sprockets to turn.

A belt keeper is formed by the two cross-bars 100,102 which are upstanding from the side members 40,42 of the frame. Longitudinal members extend from the cross-bars 100,102, adjacent the belt 80 to act as a keeper. The longitudinal members 104,106 curve around adjacent the belt 80 on the forward end and carry a mud scraper 108 on the rear. Note that the cross-bars 100,102 do not extend clear across, but are supplemented by cross-bars 101,103 as shown in FIG. 6.

The side bars 40,42 are attached, through angle irons 110,112 to the struts 114,116,118,120 for attachment to the boom of the radish picker. Adjustable nuts connect the struts, as shown at 130,132,134,136 to eye members 140,142,144, 146.

In operation, the vehicle 20 is first positioned relative to the radish picker 12 to support the radish picker end 16 clear of the ground on hard or soggy soil.

As the tractor 10 moves forward, the boom 12 pushes the vehicle 20 which, because of the engagement of the belt 80 with the ground rolls over the surface of the ground. As the vehicle 20 moves over the ground, it continues to support the boom 12 just high enough to allow radish picking by the picker 12.

As the belt 80 turns, the mud scraper 108 removes the mud held by the belt 80.

Thus, the apparatus of this invention solves the problem of supporting booms such as the boom of the radish picker 12 when the crop being picked is in soggy ground.

Although the invention has been described in detail above, it is not intended that the invention shall be limited by that description, but only by the complete specification including the drawings and claims.

I claim:

1. A vehicle comprising:
   first and second spaced apart, substantially identical and substantially parallel frame bars which are telescopic and have screw adjustments for varying their lengths;
   first and second sprockets connected for rotation substantially at the front and trailing ends of said first frame bar;
   third and fourth sprockets connected for rotation substantially at the front and trailing ends of said second frame bar;
   a first sprocket chain mounted upon said first and second sprockets;
   a second sprocket chain mounted upon said third and fourth sprockets;
   a plurality of cross-bars distributed along and connecting said chains;
   a plurality of belt segments, sized to fit over said sprocket chains, attached by their leading edge to said cross-bars, the trailing edge of each said belt segment being unattached and overlying the leading edge of the next following said segment;
   first and second angle irons attached, respectively, substantially to the center of said frame bars and extending upwards therefrom; and
   a pair of length-adjustable linkages attached to said angle irons to position said vehicle up and down and back and forth relative to the apparatus it supports.

2. A vehicle as recited in claim 1 in which:
   said first and second sprockets are connected for rotation relative to said first frame bar about first and second substantially parallel axes;
   said third and fourth sprockets are connected for rotation relative to said second frame bar about third and fourth axes which are, respectively, substantially coaxial to said first and second axes at the front and trailing ends of said second frame bar;
   said cross-bars are substantially parallel and distributed substantially uniformly along said chains and extending between and connecting said chains; and
   said belt segments are flexible belt segments with the trailing edge of each said belt segment overlying the leading edge and cross-bars of the next following said segment.

3. A vehicle comprising:
   at least a pair of sprockets having substantially parallel spaced-apart axes, said sprockets supporting at least one sprocket chain, said sprocket chain supporting a plurality of substantially uniformly spaced cross-bars;
   a plurality of flexible track segments attached by their leading edges to said cross-bars to be supported by said cross-bars, the trailing edge of each said track segment being unattached and overlying the leading edge and cross-bar of the next following segment;
   a frame having at least one frame bar, supporting said sprockets for rotation, said frame bar being telescopic and having a screw adjustment for varying its length; and
   said frame further supporting a belt keeper frame outside and overlying said track segments, and including a pair of longitudinally spaced bars upstanding from said frame, and a longitudinally directed bar attached to said upstanding bars for limiting motion of and confining the unattached edges of said track segments.

4. A vehicle as recited in claim 3 and further comprising first and second angle irons attached to different sides of the center of said frame, respectively, and extending upward therefrom; and
   a pair of length-adjustable linkages attached to said angle irons to position said vehicle up or down and back and forth relative to the apparatus it supports.

* * * * *